(12) United States Patent
Gross et al.

(10) Patent No.: US 11,042,428 B2
(45) Date of Patent: Jun. 22, 2021

(54) SELF-OPTIMIZING INFERENTIAL-SENSING TECHNIQUE TO OPTIMIZE DEPLOYMENT OF SENSORS IN A COMPUTER SYSTEM (71) Applicant: Oracle International Corporation, Redwood Shores, CA (US)

(72) Inventors: Kenny C. Gross, Escondido, CA (US); Ashwini R. More, San Diego, CA (US)

(73) Assignee: Oracle International Corporation, Redwood Shores, CA (US)

(*) Notice: Subject to any disclaimer, the term of this patent is extended or adjusted under 35 U.S.C. 154(b) by 1067 days.

(21) Appl. No.: 15/601,766

(22) Filed: May 22, 2017

(65) Prior Publication Data

US 2018/0336483 A1   Nov. 22, 2018

(51) Int. Cl.
*G06F 11/00* (2006.01)
*G06N 20/00* (2019.01)

(52) U.S. Cl.
CPC ........... *G06F 11/006* (2013.01); *G06N 20/00* (2019.01)

(58) Field of Classification Search
CPC ............................ G06F 11/006; G06N 20/00
See application file for complete search history.

(56) References Cited

U.S. PATENT DOCUMENTS

| 2008/0255819 A1* | 10/2008 | Gross | G06F 11/008 703/13 |
| 2012/0237117 A1* | 9/2012 | Liu | G06K 9/00228 382/159 |
| 2013/0159223 A1* | 6/2013 | Bahl | G01D 1/00 706/12 |

OTHER PUBLICATIONS

Cardell-Oliver, Rachel, and Chayan Sarkar. "Robust sensor data collection over a long period using virtual sensing." Proceedings of the Workshop on Time Series Analytics and Applications. 2016. (Year: 2016).*

* cited by examiner

*Primary Examiner* — Kevin W Figueroa
(74) *Attorney, Agent, or Firm* — Park, Vaughan, Fleming & Dowler LLP (57) ABSTRACT

We disclose a system that optimizes deployment of sensors in a computer system. During operation, the system generates a training data set by gathering a set of n signals from n sensors in the computer system during operation of the computer system. Next, the system uses an inferential model to replace one or more signals in the set of n signals with corresponding virtual signals, wherein the virtual signals are computed based on cross-correlations with unreplaced remaining signals in the set of n signals. Finally, the system generates a design for an optimized version of the computer system, which includes sensors for the remaining signals, but does not include sensors for the replaced signals. During operation, the optimized version of the computer system: computes the virtual signals from the remaining signals; and uses the virtual signals and the remaining signals while performing prognostic pattern-recognition operations to detect incipient anomalies that arise during execution.

20 Claims, 9 Drawing Sheets

SELF-OPTIMIZING INFERENTIAL-SENSING TECHNIQUE TO OPTIMIZE DEPLOYMENT OF SENSORS IN A COMPUTER SYSTEM

BACKGROUND

Field

The disclosed embodiments generally relate to techniques for enhancing reliability in computer systems. More specifically, the disclosed embodiments relate to a self-optimizing inferential-sensing technique that replaces physical sensors in a computer system with highly accurate virtual sensors, wherein the accuracy of the virtual sensors is maximized while associated computational overhead is minimized.

Related Art

Businesses are relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is critically important to ensure high availability in such enterprise computing systems.

To achieve such high availability in enterprise computing systems, it is necessary to be able to capture unambiguous diagnostic information that can quickly pinpoint the source of defects in hardware or software. Some high-end servers contain thousands of physical sensors that measure various parameters, such as temperatures, voltages and currents. These sensors protect the system by detecting when a parameter is out of bounds and, if necessary, shutting down a component, a system board, a domain, or the entire system.

However, as the number of physical sensors in high-end servers continues to grow, the associated data-acquisition circuitry is growing proportionately, which is increasing overall system cost and complexity. Also, the bandwidth required to communicate sensor data from the increasing number of sensors is beginning to push up against bandwidth limitations of the serial Inter-Integrated Circuit ($I^2C$) bus, which is commonly used to communicate the sensor data. These bandwidth limitations are causing system designers to reduce the sampling rate for these physical sensors, which can adversely affect the effectiveness of the sensors in detecting failures.

Hence, what is needed is a technique for reducing the number of physical sensors in a computer system while minimizing associated computational overhead.

SUMMARY

The disclosed embodiments relate to a system that optimizes deployment of sensors in a computer system. During operation, the system generates a training data set by gathering a set of n signals from n sensors in the computer system during operation of the computer system. Next, the system uses an inferential model to replace one or more signals in the set of n signals with corresponding virtual signals, wherein the virtual signals are computed based on cross-correlations with unreplaced remaining signals in the set of n signals. Finally, the system generates a design for an optimized version of the computer system, which includes sensors for the remaining signals, but does not include sensors for the replaced signals. During operation, the optimized version of the computer system: computes the virtual signals from the remaining signals; and uses the virtual signals and the remaining signals while performing prognostic pattern-recognition operations to detect incipient anomalies that arise during execution of the computer system.

In some embodiments, the system additionally optimizes an observation rate for the set of n signals.

In some embodiments, while using the inferential model to replace the signals in the set of n signals, the system iteratively performs the following operations while ensuring that a pre-specified accuracy criterion is met: executing a signal-optimization loop to drop a worst signal in a set of remaining signals; and executing an observation-optimization loop one or more times to reduce an observation rate for the set of remaining signals.

In some embodiments, while executing the signal-optimization loop, the system trains and runs the inferential model on the set of remaining signals. Next, the system uses results obtained from running the inferential model to calculate a baseline root-mean-squared error (RMSE) for the set of remaining signals. The system then executes an inner loop for each signal in the set of remaining signals, wherein each inner-loop execution excludes a different signal from the set of remaining signals and runs the inferential model on the set of remaining signals without the excluded signal to calculate an RMSE. After the inner loop is executed for each signal in the set of remaining signals, the system identifies a "worst" signal for which the exclusion of the signal yields a lowest RMSE, and drops the worst signal from the set of remaining signals.

In some embodiments, during each execution of the observation-optimization loop, the system: drops observations from the training data set to reduce an observation rate for the set of remaining signals; trains and runs the inferential model on the set of remaining signals with the reduced observation rate; and calculates an RMSE. If the calculated RMSE exceeds a pre-specified threshold, the system terminates execution of the observation-optimization loop.

In some embodiments, the inferential model is trained using a nonlinear, nonparametric (NLNP) regression technique.

In some embodiments, the NLNP regression technique comprises a Multivariate State Estimation Technique (MSET).

In some embodiments, the set of n signals can include: signals associated with physical performance parameters measured through sensors within the computer system; and signals associated with internal performance parameters maintained by software within the computer system.

In some embodiments, detecting the incipient anomaly involves detecting: an impending failure of the computer system; or a malicious-intrusion event in the computer system.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

There exist many engineered systems in which it is difficult or expensive to deploy a physical sensor in a mechanical or electromechanical component or subsystem. For such systems, it may be more economical to instead use an "analytical estimate" that is computed from first-physics equations, thereby avoiding the cost, complexity, and added circuitry of a real physical sensor.

In an example of first-physics "virtual sensing," if one has a cylinder in a reciprocating engine compressing a gaseous mixture on each cycle, one could measure the temperature of the gas T, the pressure of the gas P, and the volume of the compressed space V from the geometry of the cylinder and the displacement. However, pressure gauges do not have long-term reliability in harsh operating environments, so instead of deploying a real physical pressure gauge in each cylinder, one can apply the laws of gas physics and approximate the pressure P from the well-known ideal gas law: $P*V=N*R*T$, and have a "virtual sensor" that is computed from the approximation $(N*R*T)/V$.

In another example, some computer servers use a first-physics expression to report the real-time power of internal components, such as CPUs, power supplies, and fan motors, by measuring the current I and voltage V to the component, and computing a "virtual power" signal $P=k*I*V$, where "k" is a scalar calibration coefficient.

Although "first-physics" analytical sensing has been done for decades, some enterprise computing systems have begun using a new inferential technique for analytical sensing. (See U.S. Pat. No. 7,292,952, issued Nov. 6, 2007, entitled "Inferential Sensing for Enhanced Reliability, Availability, and Serviceability of Enterprise Computing Servers," by inventors Kenny C. Gross, et al.) In this new inferential-sensing technique, virtual sensors are computed not from physics equations, but from an advanced pattern-recognition technique based on nonlinear, nonparametric (NLNP) regression. The advantage of this new inferential-sensing technique over first-physics analytical sensing is that inferential sensing via NLNP regression has much higher accuracy over a much broader range of operation for whatever metrics are computed from first-physics equations. For example, in each of the two first-physics examples presented above, a scalar coefficient is used, namely the ideal gas law constant in the first example, and the calibration coefficient k for the power equation in the second example. Although it is computationally efficient in first-physics equations to select an average scalar coefficient for estimation of virtual-sensor metrics, it is well-known that the scalar coefficient is most accurate in the "middle" of the range of the variables of interest, but this average scalar coefficient may be less accurate at the high or low ends of the range of interest.

In contrast, the new inferential-sensing technique uses a model, which is trained using data spanning the full range of operability for the systems under surveillance, so the resulting virtual sensors are accurate even at the extremes of the operating range, where nonlinear effects may be present, which can cause inaccuracies for first-physics expressions that depend upon average scalar coefficients.

Figure 1A:
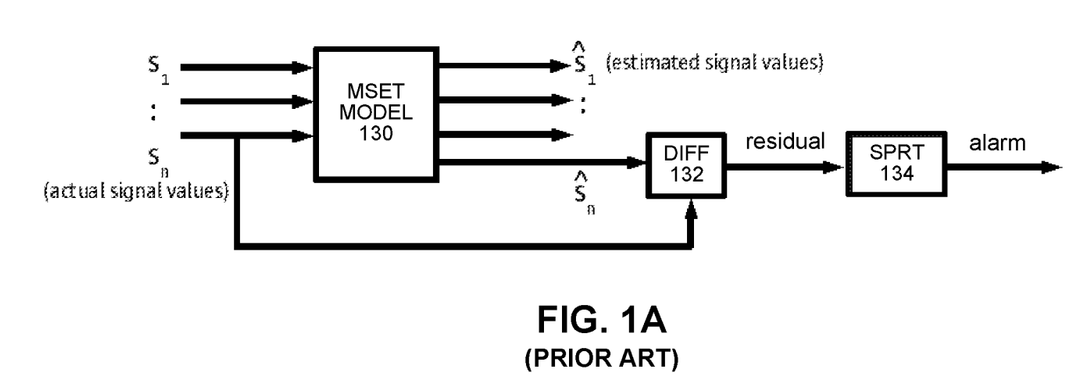
FIG. 1A illustrates a conventional data-driven prognostic-monitoring system.

FIG. 1A illustrates how data-driven prognostic monitoring is presently achieved in existing systems using such an inferential-sensing technique. Referring to FIG. 1A, for specific systems, processes, or assets under surveillance, there exist a collection of n time-series sensor signals, $S_1$, $S_2$, . . . , $S_n$, that are being monitored. These time-series signals feed into an MSET pattern-recognition model 130, wherein MSET is an acronym for "Multivariate State Estimation Technique." Note that MSET is used in some of the disclosed embodiments. However, the disclosed embodiments can generally use any one of a generic class of pattern-recognition techniques called nonlinear, nonparametric (NLNP) regression, which includes neural networks, auto-associative kernel regression (AAKR), and even simple linear regression (LR).

In the scheme illustrated in FIG. 1A, the MSET model 130 is "trained" to learn patterns of correlation among all of the monitored time-series signals $S_1, S_2, \ldots, S_n$. This training process involves a one-time, computationally intensive calculation that is performed offline with accumulated data that contains no anomalies. The pattern-recognition system is then placed into a "real-time surveillance mode," wherein the trained MSET model 130 predicts what each signal should be, based on other correlated variables; these are the "estimated signal values" illustrated in FIG. 1A. Prognostic fault detection is achieved by using a differencing module 132 to perform a pairwise differencing operation between the actual signal values and the estimated signal values. The system then applies a "detection operation" to the residuals generated by the differencing operation by using a Sequential Probability Ratio Test (SPRT) module 134 to detect anomalies and possibly generate an alarm.

While using this inferential-sensing technique, it is often the case that using every possible signal that is available at the full nominal sampling rates for those signals is overkill. Moreover, the compute cost for the new inferential-sensing technique increases with the number of sensors and the number of observations. More specifically, the compute cost for NLNP regression goes up roughly with the square of number of signals monitored, and roughly linearly with the number of observations per signal (i.e., with the sampling rate for the signals).

For common applications of the inferential-sensing technique, the most important functional requirement is the accuracy of the virtual sensor. If we turn this situation around, and specify as a functional requirement that the accuracy of the "virtual sensor" needs to be the same as the accuracy of a "real" sensor measuring the same signal, then because sensors are quite dense in many current-generation servers (e.g., a small server has >400 sensors, and larger servers have >3000 sensors), and with the high digital sampling rates available from monitored data acquisition (DAQ) instrumentation, if we feed the inferential MSET (IMSET) model all of the available signals with the fastest sampling rates used by the DAQ, we far exceed the functional requirement on prediction accuracy.

On the other hand, if we reduce the number of signals being consumed by IMSET by systematically and iteratively throwing out the "worst" signal in terms of contribution to prognostic accuracy, and/or if we systematically and iteratively "down-sample" the observations used by IMSET, we can still meet the accuracy requirement, but with a significantly smaller computational overhead for the inferential computations.

To this end, we have developed a novel inferential-sensing technique that systematically "weeds out" the least-valuable signals consumed by the NLNP regression technique, and systematically "weeds out" the associated observations, in a manner that preserves accuracy requirements, and attains the lowest possible overall compute cost for applications related to dense-sensor enterprise computing systems and/or dense-sensor internet of things (IoT) systems.

Before describing this new inferential-sensing technique, we first describe details of an exemplary system on which it operates.

Exemplary Prognostics System

Figure 1B:
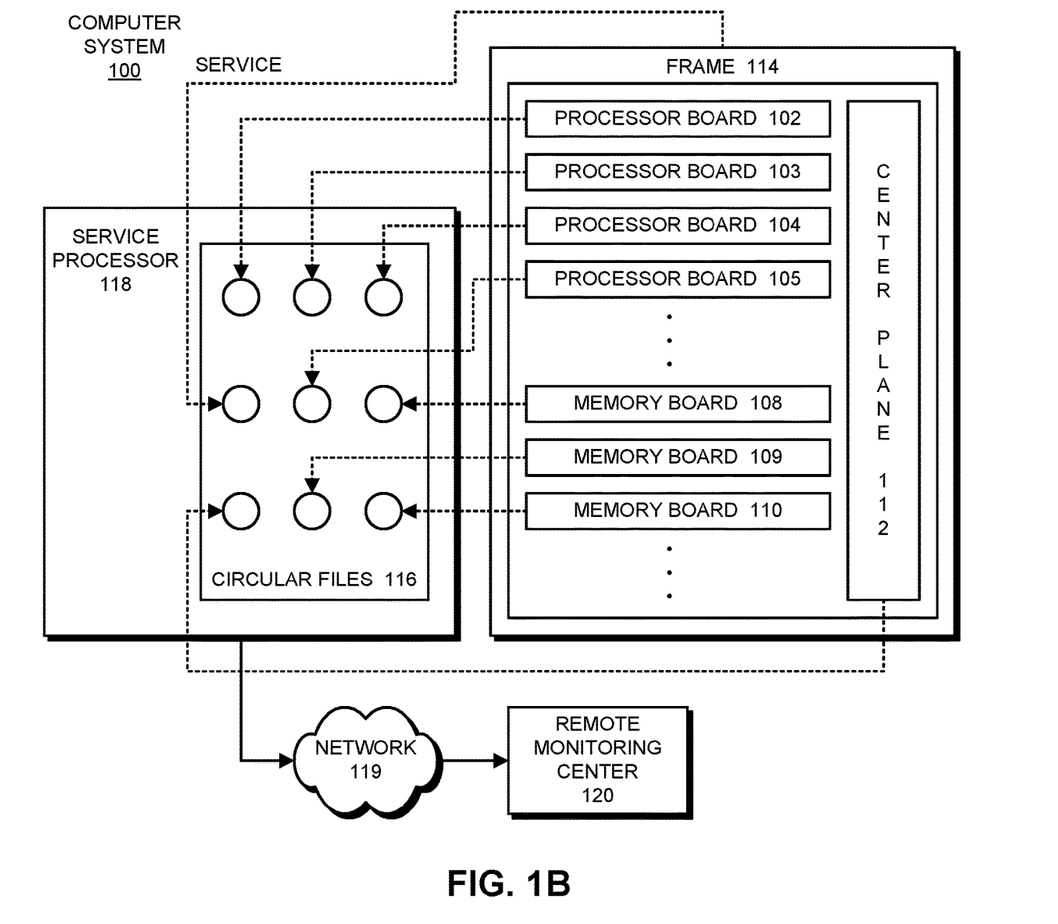
FIG. 1B illustrates a computer system that includes a service processor for processing telemetry signals in accordance with the disclosed embodiments.

We now describe an exemplary implementation of a computer system 100, which includes a prognostics system that uses an inferential-sensing technique to analyze telemetry data. This prognostics system can obtain telemetry data from: an operating system of the computer system, a set of sensors in the computer system, and/or one or more external sensors that reside outside the computer system. As shown in FIG. 1B, computer system 100 includes a number of processor boards 102-105 and a number of memory boards 108-110, which communicate with each other through center plane 112. These system components are all housed within a frame 114.

In one or more embodiments, these system components and frame 114 are all "field-replaceable units" (FRUs), which are independently monitored as is described below. Note that all major system units, including both hardware and software, can be decomposed into FRUs. For example, a software FRU can include an operating system, a middleware component, a database, and/or an application.

Computer system 100 is associated with a service processor 118, which can be located within computer system 100, or alternatively can be located in a standalone unit separate from computer system 100. For example, service processor 118 may correspond to a portable computing device, such as a mobile phone, laptop computer, personal digital assistant (PDA), and/or portable media player. Service processor 118 may include a monitoring mechanism that performs a number of diagnostic functions for computer system 100. One of these diagnostic functions involves recording performance parameters from the various FRUs within computer system 100 into a set of circular files 116 located within service processor 118. In one embodiment of the present invention, the performance parameters are recorded from telemetry signals generated from hardware sensors and software monitors within computer system 100. (Note that the software monitors that generate telemetry signals are also referred to as "software sensors" or simply sensors within this specification and the appended claims.) In one or more embodiments, a dedicated circular file is created and used for each FRU within computer system 100. Alternatively, a single comprehensive circular file may be created and used to aggregate performance data for all FRUs within computer system 100.

The contents of one or more of these circular files 116 can be transferred across network 119 to remote monitoring center 120 for diagnostic purposes. Network 119 can generally include any type of wired or wireless communication channel capable of coupling computing nodes. This includes, but is not limited to, a local area network (LAN), a wide area network (WAN), a wireless network, and/or a combination of networks. In one or more embodiments, network 119 includes the internet. Upon receiving one or more circular files 116, remote monitoring center 120 may perform various diagnostic functions on computer system 100, as described below with respect to FIG. 2. The system of FIG. 1 is described further in U.S. Pat. No. RE43,154 (issued Jan. 31, 2012), by inventors Kenny C. Gross and Larry G. Votta, Jr., entitled "Method and Apparatus for Monitoring and Recording Computer System Performance Parameters," which is incorporated herein by reference.

Figure 2:
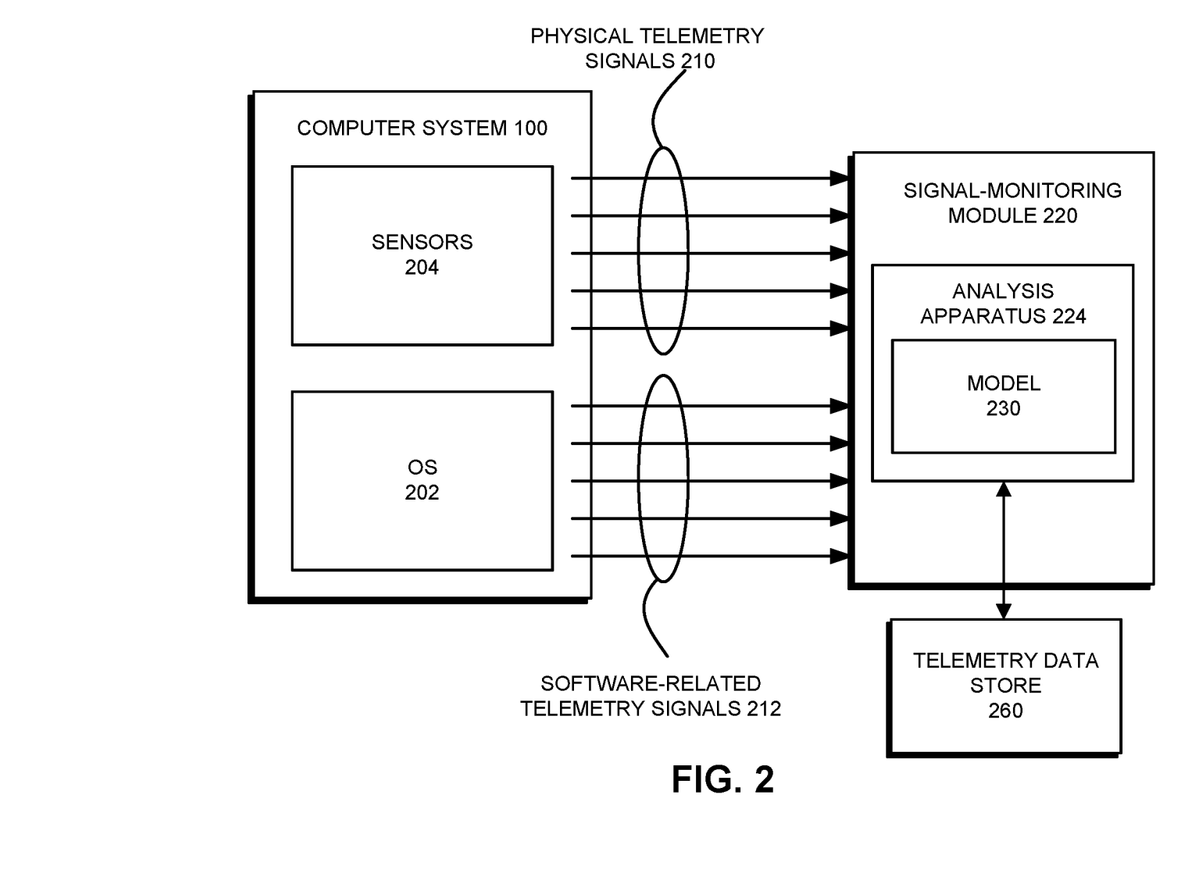
FIG. 2 illustrates a telemetry-analysis system in accordance with the disclosed embodiments.

FIG. 2 shows an exemplary telemetry-analysis system that performs prognostic pattern-recognition operations in accordance with an embodiment. In this example, computer system 100 is monitored using a number of telemetric signals, including physical telemetry signals 210 and software-related telemetry signals 212, which are transmitted to a signal-monitoring module 220. Signal-monitoring module 220 may assess the state of computer system 200 using these telemetry signals 210 and 212. For example, signal-monitoring module 220 may analyze telemetry signals 210 and 212 to detect and manage faults in computer system 200 and/or issue alerts when there is an anomaly or degradation risk in computer system 200.

Signal-monitoring module 220 may be provided by and/or implemented using a service processor associated with computer system 200. Alternatively, signal-monitoring module 220 may reside within a remote monitoring center (e.g., remote monitoring center 120 of FIG. 1B) that obtains telemetry signals 210 and 212 from computer system 200 over a network connection. Moreover, signal-monitoring module 220 may include functionality to analyze both real-time telemetry signals 210 and 212 and long-term historical telemetry data. For example, signal-monitoring module 220 may be used to detect anomalies in telemetry signals 210 and 212 received directly from the monitored computer system(s). Signal-monitoring module 220 may also be used during offline detection of anomalies from the monitored computer system(s) by processing archived and/or compressed telemetry data associated with the monitored computer system(s).

Prior to analyzing telemetry signals 210 and 212, analysis apparatus 224 may aggregate and pre-process telemetry signals 210 and 212. Moreover, during pre-processing of telemetry signals 210 and 212, analysis apparatus 224 may synchronize disparate sampling streams by standardizing timestamps of telemetry signals 210 and 212 from different domains. Next, analysis apparatus 224 may transform telemetry signals 210 and 212 into signals with uniform sampling rates. For example, analysis apparatus 224 may use an analytical re-sampling process (ARP) to up-sample signals with slower sampling rates to match the highest sampling rates in the aggregation of monitored telemetry signals 210 and 212.

The aggregated, pre-processed and transformed telemetry signals 210 and 212 can also be stored in a telemetry data store 260 to facilitate training prognostic pattern-recognition models.

In one or more embodiments, the nonlinear, nonparametric regression technique used by analysis apparatus 224 corresponds to a Multivariate State Estimation Technique (MSET). Analysis apparatus 224 may be trained using historical telemetry data from computer system 200 and/or similar computer systems. The historical telemetry data may be used to determine correlations among various telemetry signals 210 and 212 collected from the monitored computer system, wherein the correlations are embodied in a model 230 that can be used to detect incipient anomalies that arise during operation of computer system 200.

Those skilled in the art will appreciate that the nonlinear, nonparametric regression technique used in analysis apparatus 224 may be provided by any number of pattern-recognition techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington, D.C., Nov. 13-17, 2000. This paper outlines several different pattern-recognition approaches. Hence, the term "MSET" as used in this specification can refer to (among other things) any of the 25 techniques outlined in Gribok, including Ordinary Least Squares (OLS), Support Vector Machines (SVM), Artificial Neural Networks (ANNs), MSET, or Regularized MSET (RMSET).

Use Cases

There exist a number of use cases where the above-described inferential-sensing technique can provide value to customers. Several important use cases are outlined below.

Faulted Sensor Replacement—

An unfortunate feature of enterprise servers is that there is no redundancy in physical sensors. Safety-critical industries often use triple redundancy in sensors. This means instead of putting a single temperature sensor at a location on a component, they put three temperature sensors at that location and then use 2-out-of-3 voting before reporting a temperature value. In this way, if a sensor degrades in service, that sensor does not make it past the "voting" process. Moreover, in enterprise servers, there is no sensor redundancy. Hence, the associated cooling, control, and protection systems typically depend on single sensors, which typically cost less than $1 and were calibrated just once before the server was assembled and will never be calibrated again. In fact, millions of sensors in large enterprise data centers have shorter mean time between failures (MTBFs) than the assets the sensors are supposed to protect! If such sensors degrade in service and drift out of calibration in the high direction, then assets get shut down unnecessarily. On the other hand, if the sensors drift in the other direction, then cooling systems can erroneously back off and damage or destroy very expensive computing assets.

By using the new inferential-sensing technique, no matter how many signals are available for the inferential-variable pattern recognition module (e.g., MSET), no matter what the correlation structure is among the multiple sensors, and no matter what the signal-to-noise ratio is for the individual measured metrics going into the inferential-variable module, we now have an autonomic process for optimizing the accuracy of the virtual sensor while minimizing the associated computational overhead for real-time streaming applications.

Virtual Sensors for New Products—

Instead of replacing a physical sensor that degrades while in service, there can be tremendous cost savings by not deploying a physical sensor in the first place. For example, consider the case of real-time power monitoring of individual assets without hardware power meters. In enterprise servers, data centers typically provide "rack level" power monitoring via Power Distribution Units (PDUs) in the data center, which tracks how much power goes to one or more racks full of servers. However, many customers want to have "box-level" granularity in their power monitoring to measure the power consumed by every server in the data center. (One reason for this is that some companies are starting to do "chargeback billing" of energy costs to their own internal business units, and they consequently want to track the power used by every individual server in the data center.)

A large modern data center can have as many as 11,000 servers. Moreover, commercial "smart cords," which contain a power meter in every cord, are available. However, because servers have to have two redundant power sources for every server, this means a typical data center has to provision 22,000 expensive "smart cords" to achieve box-level granularity. The new inferential-sensing system enables a server vendor to perform an inferential-variable design experiment for a server, by applying a high-accuracy power meter to the server and measuring all internal telemetry variables (voltages, temperatures, fan speeds, currents, loads on CPUs and memory, etc.), and then using the results of this experiment to train a highly accurate inferential-variable model. The server vendor can then remove the high-accuracy power meter from the servers, and can sell the servers with a highly accurate "inferential power meter" implemented in firmware. With this new inferential-sensing system, "soft metering" of real-time power dynamics for servers can be achieved with a pre-desired accuracy for the power monitoring, and with the lowest possible compute cost for real-time power monitoring. Moreover, this optimization is performed autonomically for each enterprise server application. Also, the customer does not have to hire a data scientist with a Ph.D. to determine the minimum number of signals and minimum sampling rates for those signals to achieve the desired virtual sensor accuracy.

Improved Prognostic Cyber Security—

The new inferential-sensing technique can also be used to learn the patterns of interaction among multiple classes of telemetry metrics while there is no malicious activity in a data center, and then detect the incipience of anomalous patterns should subsequent malicious intrusion events occur. Because degraded sensors in servers can appear to be "false alarm" anomalies, it is valuable to the goals of prognostic cyber security to be able to detect degrading and/or failed sensors in information-technology assets, and to swap in highly accurate "virtual sensors" so that false alarms do not bother system administrators or security personnel.

Empirical Results

Our new inferential-sensing technique can be used to monitor applications with any number of signals, any degree of cross-correlation among those signals, any signal-to-noise ratio for the individual signals, and any nominal sampling rates for the monitored signals. To provide an illustrative example, we have created an exemplary data set that includes 30 monitored time-series metrics. This exemplary data set was constructed to span the gamut of signals seen in data centers, from high-accuracy, well-correlated signals to low-accuracy, low-resolution, poorly correlated signals.

Experiments performed on this exemplary data set demonstrate how the automated optimization procedure yields an optimal inferential variable model, without a customer having to have significant data science expertise. This automated procedure is autonomic and can be executed by users who have nothing more than a data set of time-series signals available from whatever asset is being monitored in an associated facility, laboratory, or data center.

Figure 3:
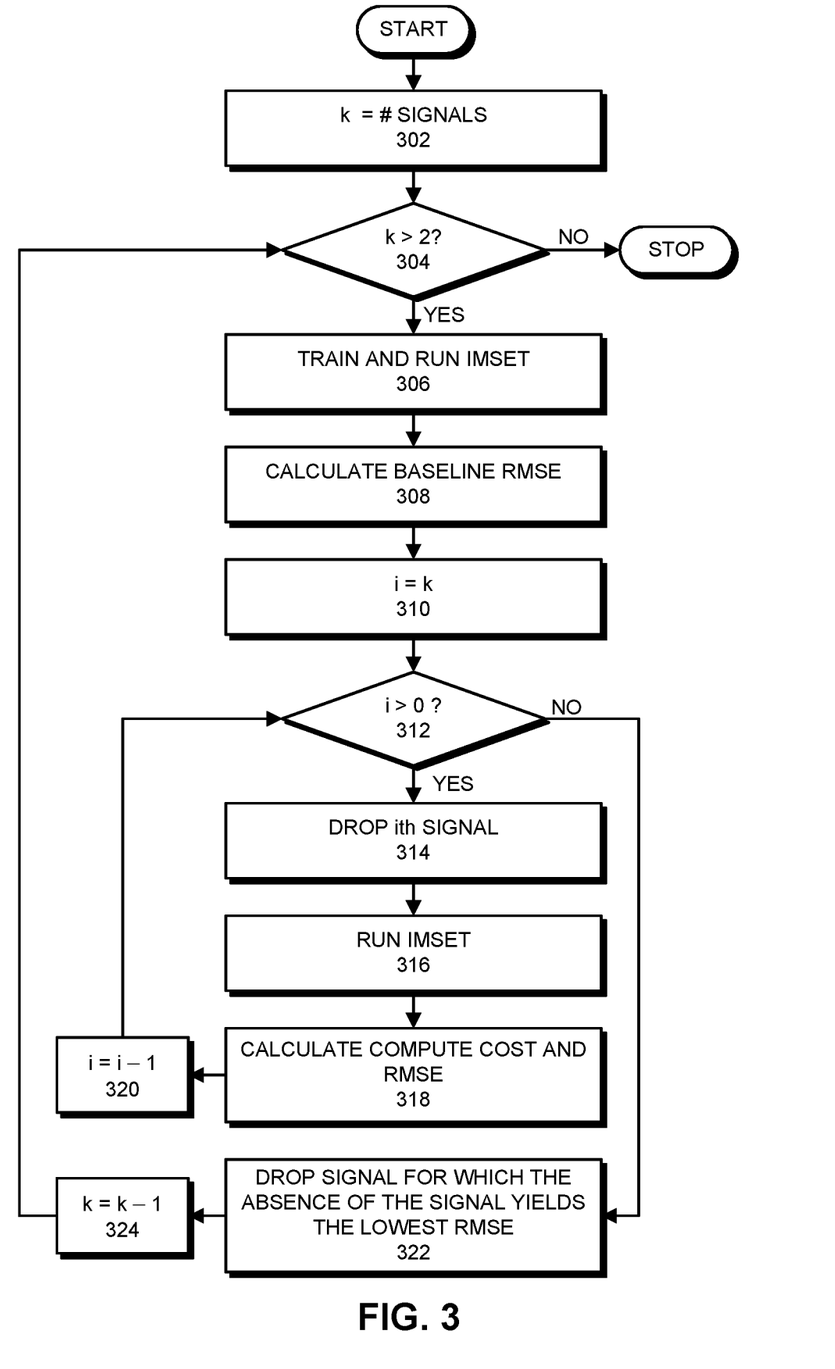
FIG. 3 presents a flow chart illustrating operations involved in a signal-optimization loop in accordance with the disclosed embodiments.

Part of the automated procedure involves a signal-optimization loop, which is illustrated in the flow chart that appears in FIG. 3. This signal-optimization loop includes an outer loop and an inner loop. At the start of the outer loop, a counter variable k is set to the number of signals (step 302) in a set of remaining signals. Next, the system determines whether k is greater than 2 (step 304). If not (NO at step 304), the system stops. Otherwise (YES at step 304), the system proceeds to train and run an inferential MSET (IMSET) model (step 306). Next, the system calculates a baseline RMSE (step 308) using results obtained from running the IMSET model. The system then sets a counter variable i equal to k (step 310) and starts executing the inner loop. Within this inner loop, the system first determines if i is greater than zero (step 312). If so (YES at step 312), the system drops the ith signal (step 314) from the set of remaining signals and then runs IMSET (step 316). Next, the system calculates the compute cost involved in running IMSET and also calculates an RMSE for the set of remaining signals without the ith signal (step 318). Next, the system sets i=i−1 (step 320), and returns to step 312. Next, if the system determines that i is not greater than zero (NO at step 312), the system drops a signal for which the absence of the signal yields the lowest RMSE (step 322), and sets k=k−1 (step 324) before returning to step 304 to complete an iteration of the outer loop.

While the structure of the signal-optimization loop illustrated in FIG. 3 is similar to conventional "backward stepwise regression," there is an important difference. For conventional backward stepwise regression, one starts with a large group of N correlated time series, and then evaluates the cross-correlation coefficient for each signal in the group with all N−1 other signals in the group. After one large outer iteration, the average correlation coefficients for these N−1 correlation evaluations are used as scores, and the signal with the lowest absolute value score (because correlation coefficients can be positive or negative), is eliminated before the next outer iteration. For conventional stepwise regression, this iterative process produces a cluster of the best-correlated time series, and is typically iterated until the lowest scored signal has an average correlation coefficient which exceeds a stopping criterion (e.g., a score of 0.6).

Although the signal-optimization loop illustrated in FIG. 3 uses a similar inner-loop/outer-loop iterative structure as a conventional backward stepwise regression, there exists a significant difference. The problem with conventional stepwise regression is that it relies on a Pearson cross-correlation coefficient for its scoring. Note that such cross-correlation coefficients are really only defined for stationary time series that are linearly related. In a stationary time series, the mean value of the time series has to be flat with time and, therefore, can have noise dynamics superimposed on a stationary mean. Because of this stationarity constraint, many naïve users of conventional stepwise regression do not realize that if there is any trend in the time series (even a very small slope upward or downward in any subset of the signals), it severely distorts the cross-correlation coefficients, and hence the scoring for the stepwise regression. In fact, we can show that with a group of N purely random time-series signals, if we superimpose a small non-zero slope on a subset of those signals, conventional stepwise regression will (mistakenly) identify those signals with small slopes as being well-correlated. This issue with conventional stepwise regression is problematic for prognostic cyber security or for inferential signal generation, because the "trained" models will not be able to predict the random signals.

So, even though we use a similar inner-loop/outer-loop iterative structure in the signal-optimization loop illustrated in FIG. 3, what we are doing inside the "i" and "k" iterations is fundamentally different. Instead of using a conventional cross-correlation coefficient for the scoring, we are using IMSET itself. Recall that IMSET is a nonlinear, nonparametric (NLNP) regression model. It has no requirement for stationarity as conventional cross-correlation coefficients. It also has no requirement for linear relationships among monitored signals. Hence, IMSET works extremely well, even with highly nonlinear relationships between monitored variables.

We now present two examples from enterprise computing systems where a conventional stepwise regression technique performs very poorly because of nonlinearities, and the new inferential-sensing technique performs very well.

Fan Power Example—

Enterprise servers typically include variable-speed fans, which are used for cooling purposes, and power from internal motors of these variable-speed fans increases with the cubic power of the fan speeds. Given the currents, voltages, and fan speeds for the potentially large number of internal fans as inputs, a conventional regression approach can become very "confused" because of the highly nonlinear relationships between those variables due to the cubic-power-law relationship for the fan motors.

Leakage Power Example—

Nowadays, central-processing units (CPUs) in enterprise servers exhibit a strong "leakage power" component, which goes up exponentially with CPU junction temperatures, and creates an "autocatalytic exponentially accelerated vicious cycle." This means that if the ambient temperature goes up one degree (or the fan speeds drop by a small percentage), the leakage power in the CPUs goes up, which increases the leakage power, which increases the heat dissipation, which further increases the CPU temperature, etc. This process also works similarly in reverse when the junction temperature goes down. The complex nonlinear dynamics among response variables will confuse conventional linear stepwise regression techniques. However, IMSET (when trained with data collected through a range of ambient temperatures, CPU junction temperatures, and fan speeds) retains the ability to accurately predict any variable as a function of the other N−1 variables, in spite of the nonlinear dynamics involved.

Signal-Optimization Loop

The signal-optimization loop illustrated in FIG. 3 uses IMSET for both the inner and outer iterations, and also computes a "score," which indicates how accurately IMSET predicts each signal as a function of the remaining N−1 signals in each outer iteration. This score reflects the accuracy of the prediction. For each prediction in each iterative loop, we can express this score as the inverse of the uncertainty of prediction, as measured by the root-mean-square-error (RMSE). The idea is that the signal that is predicted with the worst accuracy (i.e., highest uncertainty) is the one that gets dropped for the next iteration. This new approach to backward stepwise regression works considerably better than conventional stepwise regression.

Figure 6A:
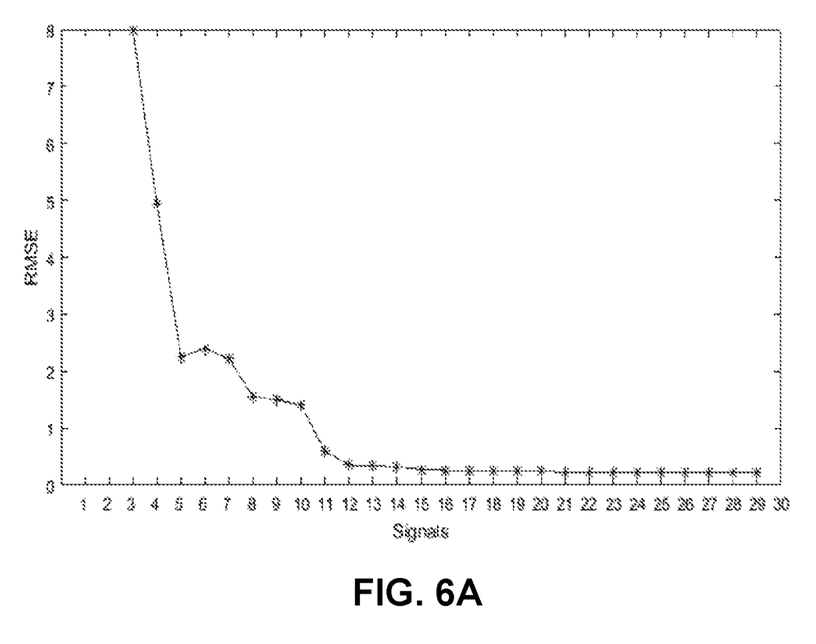
FIG. 6A presents a graph of RMSE versus number of signals for the signal-optimization loop in accordance with the disclosed embodiments.
Figure 6B:
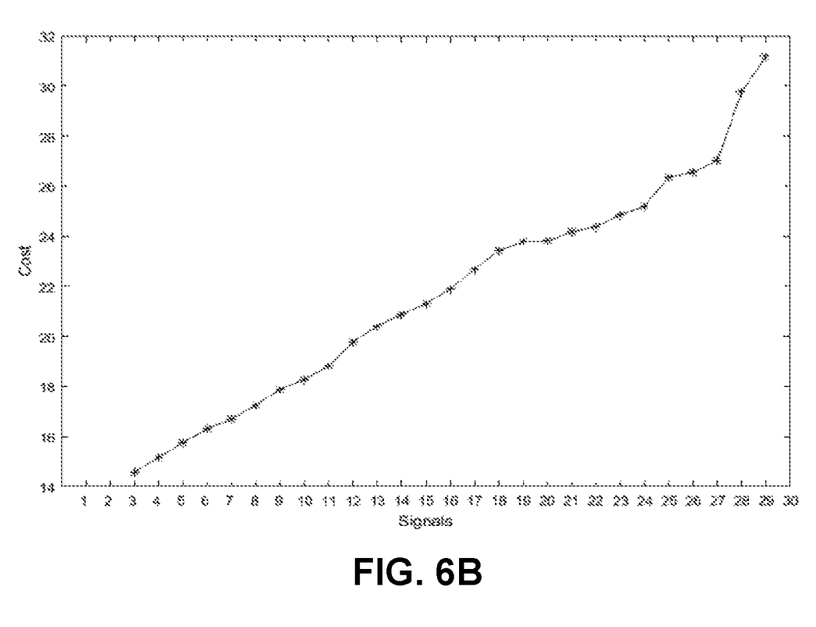
FIG. 6B presents a graph of compute cost versus number of signals for the signal-optimization loop in accordance with the disclosed embodiments.

As an illustrative example of how the signal-optimization loop illustrated in FIG. 3 could, by itself, significantly reduce compute costs for inferential variable analyses with large groups of signals having varying degrees of accuracy, serial correlation, cross-correlation, and signal-to-noise ratios, we applied one outer-iteration of the signal-optimization loop to the reference data set of 30 signals described earlier. The results of this experiment are plotted in the graphs that appear in FIGS. 6A and 6B, wherein FIG. 6A illustrates how RMSE increases as the number of signals decreases (from right-to-left), and FIG. 6B illustrates how compute cost increases as the number of signals increases (from left-to-right). From FIG. 6B, we see how we can save significant compute cost by using the signal-optimization loop alone to systematically eliminate the "worst" signals in each outer iteration, until the RMSE of the virtual signal starts to rise. As can be seen in FIG. 6A, when the iterations start with 30 signals, and the worst signal is eliminated to create a 29-signal model, and then the next worst signal is eliminated, the RMSE is extremely low and varies only negligibly as we throw out "worst" signals all the way down to an 11- to 12-signal model. (In contrast, for conventional stepwise regression, there is typically an improvement in score starting with the 29-signal model, and for each step thereafter when the "worst" signal is thrown out.) Although conventional stepwise regression appears to be improving the overall correlation of the cluster with each signal eliminated, in fact it is doing so from a position of a much higher overall RMSE. The reason that IMSET has an extremely low RMSE for the first 19 iterations of the outer loop (i.e., an extremely high accuracy for inferential variable analysis) is that IMSET is already internally weighting the cluster of dependent variables in a manner that gives the lowest weights to the worst signals.

We see in FIG. 6A that even though IMSET provides great accuracy from 29 down to 12 signals, the corresponding compute cost illustrated in FIG. 6B drops significantly with each "worst" signal that is eliminated. Referring back to FIG. 6A, we continue eliminating worst signals until the RMSE starts to rise. After all the worst signals are tossed out and the loop progresses to where it is tossing out good signals needed for optimal predictions, we see the RMSE starting to rise at about 12-11 signals. In one embodiment, we use an RMSE stopping criterion of 1.0 for the signal-optimization loop, which yields good virtual sensor predictions, but at a significantly reduced compute cost versus the naïve traditional approach of using all available signals during the prediction process.

In the above discussion, we have established that the signal-optimization loop by itself yields good performance for inferential-variable analysis. We next show how the observation-optimization loop by itself also yields good performance with respect to significantly reduced compute cost with no increase in RMSE.

Observation-Optimization Loop

For signal surveillance with high nominal sampling rates for the digitized time-series signals under surveillance, it is conceivable that virtual sensor computations do not need every signal observation for all N signals used in the inferential variable model to yield acceptably accurate virtual sensor predictions. By "backing off" slightly on sampling rates, it may be possible to gain a significant advantage in lower compute costs, while still meeting accuracy requirements for the virtual signal computations.

Although for most data acquisition systems that aggregate numerous signals from engineering assets it would be difficult and undesirable to "turn down" the sampling rate for monitored signals, we can achieve the same compute cost for the virtual signal computations by analytically "ignoring" every Mth observation. By doing so, we reduce the compute cost by a small amount when M is high (e.g., if we were to ignore every 100th observation), but compute costs reduce proportionately more as M decreases to smaller and smaller values (e.g., if M=2, we ignore every other observation). Although ignoring every Mth observation and stepping M down from a large number to a small number is expected to lower compute costs, there may be a concomitant increase in inaccuracy for the virtual signal computations, so we need to systematically optimize "weeding out" observations from the multiple time series under surveillance versus the accuracy of the virtual signal computations.

Figure 4:
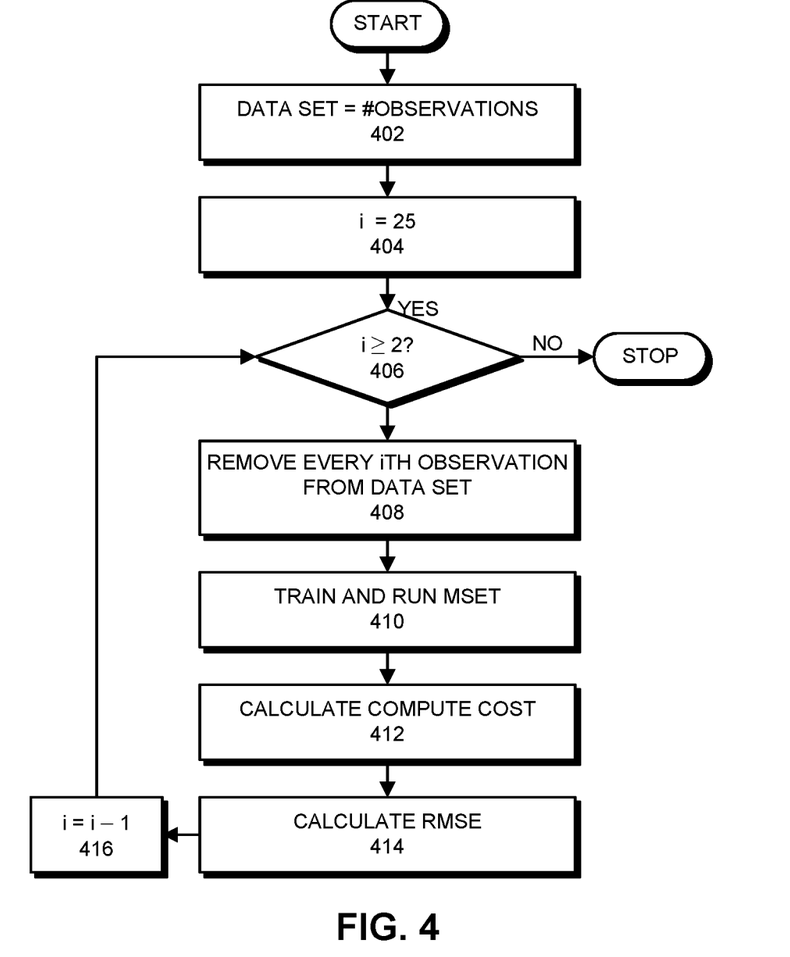
FIG. 4 presents a flow chart illustrating operations involved in an observation-optimization loop in accordance with the disclosed embodiments.

FIG. 4 presents a flow chart illustrating operations involved in an exemplary observation-optimization loop in accordance with the disclosed embodiments. At the start of the observation-optimization loop, the system initializes a data set to include a number of observations (step 402). Next, a counter variable i is set to 25 (step 404). The system then determines whether i is greater than or equal to 2 (step 406). If not (NO at step 406), the system stops. Otherwise (YES at step 406), the system removes every ith observation from the data set (step 408) and trains and runs IMSET (step 410). The system then calculates the compute cost involved in running IMSET (step 412), and also calculates an RMSE for the set of remaining signals without the ith signal (step 414). Next, the system sets i=i−1 (step 416), and returns to step 406.

In the exemplary observation-optimization loop illustrated in FIG. 4, we start with M=25 and "throw out" (i.e., ignore) every 25th observation, and then compute a new RMSE and a new compute cost. Next, we iterate the loop for every 24th observation, every $23^{rd}$ observation, and so on, down to throwing out every 2nd observation. As in the signal-optimization loop described above, we do not use a naïve Pearson cross-correlation coefficient as the "score" for reducing the "sampling rate." Note that one can alternatively reduce the sampling rate by controlling the data acquisition (DAQ) instrumentation, which is aggregating the time series. However, our system works just as well by leaving the sampling rate for the DAQ at its full nominal speed, but analytically reducing the effective sampling rate by "ignoring" every Mth observation.

Figure 7A:
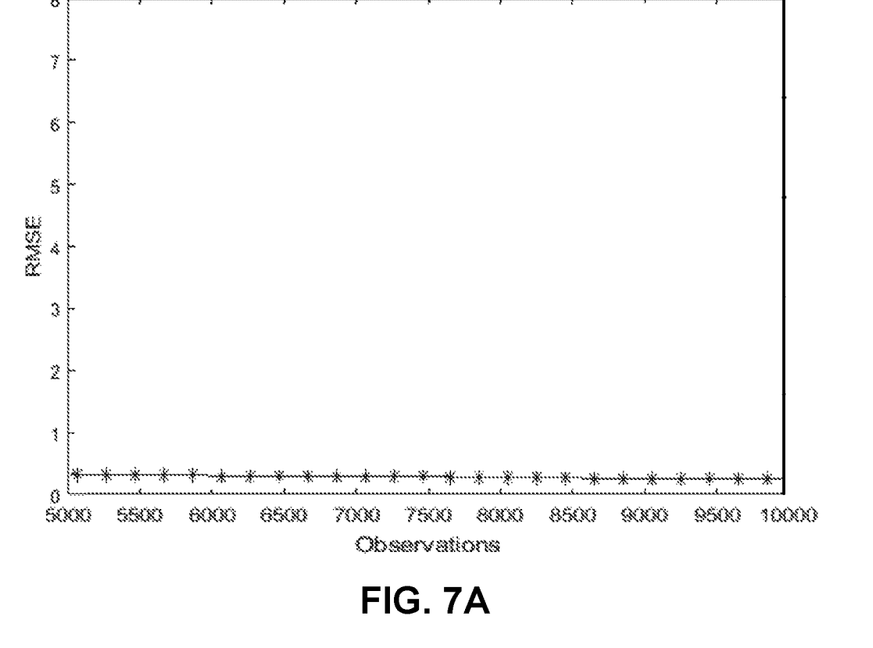
FIG. 7A presents a graph of RMSE versus number of observations for the observation-optimization loop in accordance with the disclosed embodiments.
Figure 7B:
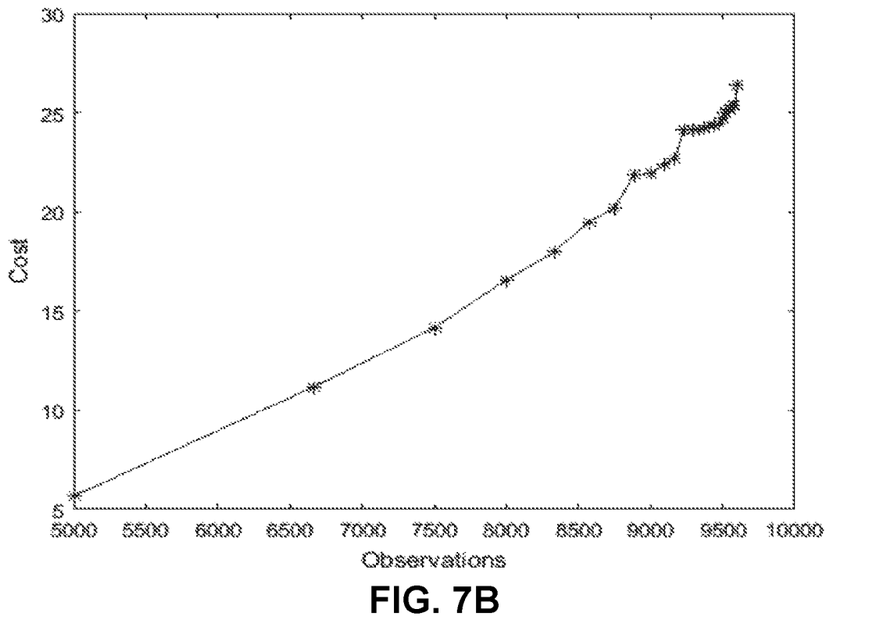
FIG. 7B presents a graph of compute cost versus number of observations for the observation-optimization loop in accordance with the disclosed embodiments.

Empirical results obtained by executing the observation-optimization loop are illustrated in FIGS. 7A and 7B. FIG. 7B illustrates how compute costs can be significantly reduced as the number of observations decreases from left-to-right, while FIG. 7A illustrates how there is a corresponding negligible deterioration in virtual signal accuracy as reflected in RMSE as the number of observations decreases from left-to-right. These figures illustrate how the observation-optimization loop, by itself, can significantly reduce compute cost with little or no deterioration in the accuracy of the inferential signal.

Bivariate Hopscotch Technique

We have developed a new "hopscotch bivariate optimization technique," which "hopscotches" between the signal-optimization loop and the observation-optimization loop to yield a substantially lower compute cost for a given accuracy for inferential variable analyses in complex engineering systems.

We demonstrated above how both the signal-optimization loop and the observation-optimization loop can significantly reduce compute costs for inferential signal analyses without any appreciable impact on the accuracy of virtual signal inferencing (as measured by RMSE). However, it is not obvious how to combine "signal optimization" with "observation optimization." For example, if one were to first reduce observations in the full 30-signal model, and then progressively reduce the number of signals in the model and stop at, say, a 20-signal model (while maintaining the same reduced number of observations), it is not obvious whether this technique would perform better than if one were to reduce the number of signals first to some stopping value, and then reduce the number of observations from that reduced-signal model.

By performing numerous experiments over a large number of data sets, we have determined that best results are achieved through the following new hopscotch bivariate optimization technique, which operates as follows. We start by using the signal-optimization loop to throw out the "worst" signal from the 30-signal model, and we record the resulting RMSE and compute cost for the new 29-signal model. Then, we "hopscotch" to the observation-optimization loop and systematically reduce observations in the signals, while at the same time ensuring that RMSE does not rise above a pre-specified accuracy criterion (e.g., RMSE<1). We then record the new RMSE and new compute cost for the 29-signal model which has been optimized to reduce observations using the observation-optimization loop. Now, we "hopscotch" back to the signal-optimization loop, and throw out the next worst signal, creating a new 28-signal model, and then hopscotch back to the observation-optimization loop to reduce the number of observations. This hopscotch technique is repeated until the RMSE starts to rise and hits a stopping criterion, which is associated with a target accuracy for the virtual signal.

Figure 5:
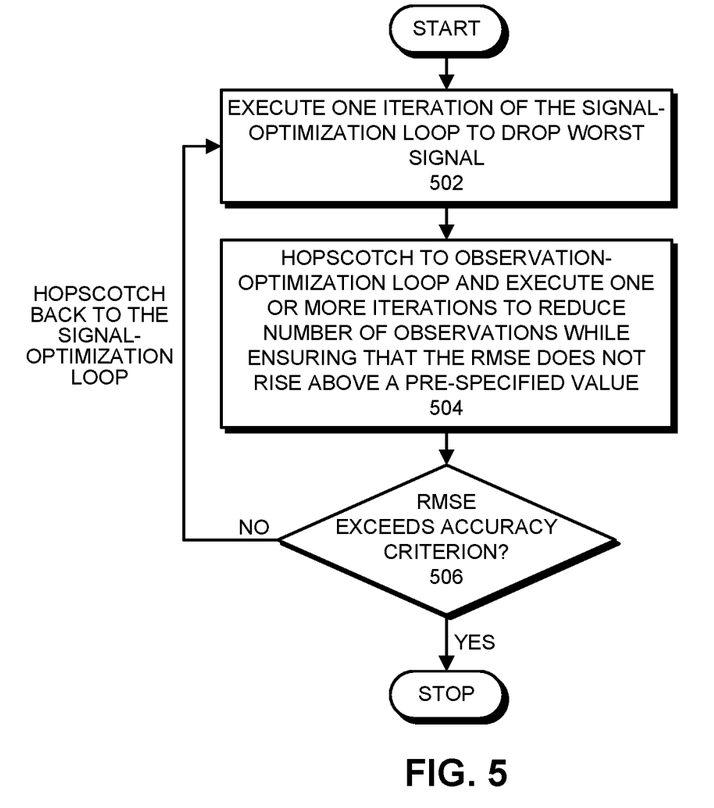
FIG. 5 presents a flow chart illustrating operations involved in a bivariate hopscotch optimization technique in accordance with the disclosed embodiments.

More formally, FIG. 5 presents a flow chart illustrating operations involved in the bivariate hopscotch optimization technique, which makes use of both the signal-optimization loop illustrated in FIG. 3 and the observation-optimization loop illustrated in FIG. 4 in accordance with the disclosed embodiments. First, the system executes one iteration of the signal-optimization loop to drop a worst signal in a set of remaining signals (step 502). Next, the system "hopscotches" to the observation-optimization loop and executes one or more iterations to reduce a number of observations while ensuring that the RMSE does not rise above a pre-specified value (step 504). Then, the system determines whether the RMSE exceeds an accuracy criterion (step 506). If not (NO at step 506), the system hopscotches back to the signal-optimization loop in step 502 to repeat the process. Otherwise, if the RMSE exceeds the accuracy criterion (YES at step 506), the system stops.

Figure 8A:
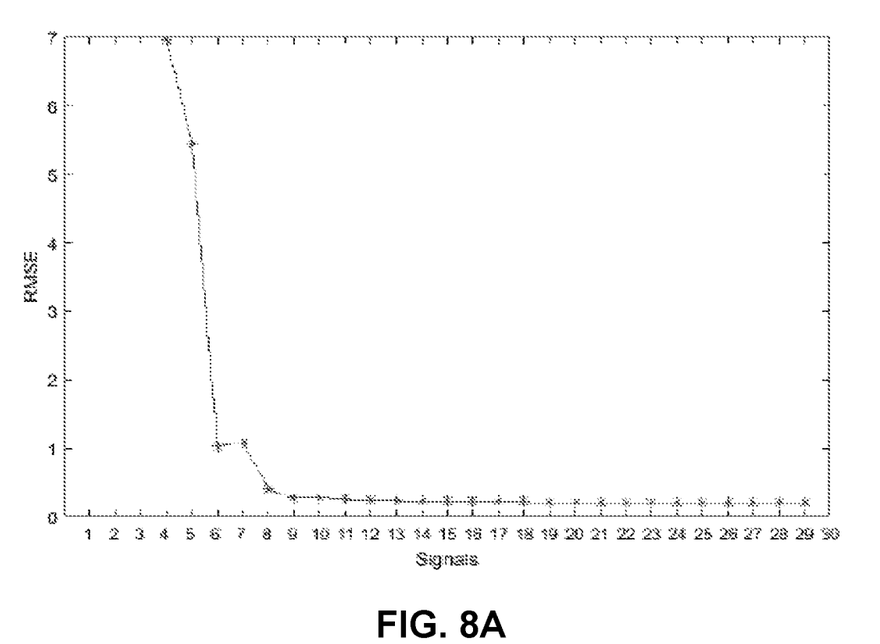
FIG. 8A presents a graph of RMSE versus number of observations for the hopscotch bivariate optimization technique in accordance with the disclosed embodiments.
Figure 8B:
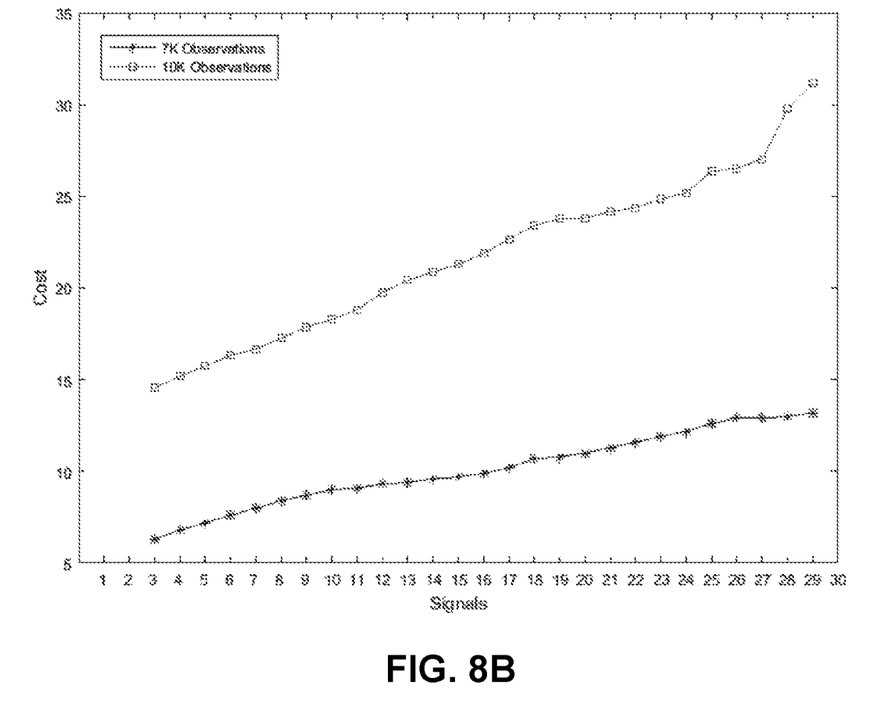
FIG. 8B presents a graph of compute cost versus number of observations for the hopscotch bivariate optimization technique in accordance with the disclosed embodiments.

The hopscotch bivariate optimization technique illustrated in FIG. 5 performs significantly better than using the signal-optimization loop by itself, or using the observation-optimization loop by itself. For example, FIG. 8A illustrates the RMSE for the overall hopscotch technique. In this example, using the stopping criterion of RMSE<1, the hopscotch bivariate optimization technique stops at an 8-signal model. FIG. 8B illustrates the added benefit from the "synergy" of the hopscotch combination of the signal-optimization loop and the observation-optimization loop. The upper cost curve shows the systematic improvement in compute cost if we were to only use the signal-optimization loop. The lower cost curve shows the dramatic improvement in compute cost obtained by using the hopscotch bivariate combination of the signal-optimization loop and the observation-optimization loop.

In summary, the new hopscotch bivariate optimization technique optimizes inferential variable computations for virtual signals in a manner that assures that inferential signal accuracy requirements are met, but with significantly reduced compute costs. This favorable result is extremely important for real-time streaming prognostic applications in enterprise computing systems, cloud data centers, and real-time dense-sensor IoT prognostic applications.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for optimizing deployment of sensors in a computer system, comprising:
    generating a training data set by gathering a set of n signals from n sensors in the computer system during operation of the computer system;
    using an inferential model to replace one or more signals in the set of n signals with corresponding virtual signals, wherein the virtual signals are computed based on cross-correlations with unreplaced remaining signals in the set of n signals; and generating a design for an optimized version of the computer system, which includes sensors for the remaining signals, but does not include sensors for the replaced signals;

wherein during operation, the optimized version of the computer system computes the virtual signals from the remaining signals, and uses the virtual signals and the remaining signals while performing prognostic pattern-recognition operations to detect incipient anomalies that arise during execution of the computer system; and wherein using the inferential model to replace the signals in the set of n signals comprises iteratively performing the following operations while ensuring that a pre-specified accuracy criterion is met:

executing a signal-optimization loop to drop a worst signal in a set of remaining signals by:

training and running the inferential model on the set of remaining signals;

using results obtained from running the inferential model to calculate a baseline root-mean-squared error (RMSE) for the set of remaining signals; and         executing an inner loop for each signal in the set of remaining signals, wherein each inner-loop execution excludes a different signal from the set of remaining signals and runs the inferential model on the set of remaining signals without the excluded signal to calculate an RMSE; and     executing an observation-optimization loop one or more times to reduce an observation rate for the set of remaining signals.

2. The method of claim 1, wherein the method additionally comprises optimizing an observation rate for the set of n signals.

3. The method of claim 1, wherein executing the signal-optimization loop further comprises:

after the inner loop is executed for each signal in the set of remaining signals:

identifying a worst signal for which the exclusion of the signal yields a lowest RMSE, and     dropping the worst signal from the set of remaining signals.

4. The method of claim 1, wherein executing the observation-optimization loop comprises:

dropping observations from the training data set to reduce an observation rate for the set of remaining signals;

training and running the inferential model on the set of remaining signals with the reduced observation rate;

calculating an RMSE; and if the calculated RMSE exceeds a pre-specified threshold, terminating execution of the observation-optimization loop.

5. The method of claim 1, wherein the inferential model is trained using a nonlinear, nonparametric (NLNP) regression technique.

6. The method of claim 5, wherein the NLNP regression technique comprises a Multivariate State Estimation Technique (MSET).

7. The method of claim 1, wherein the set of n signals can include:

signals associated with physical performance parameters measured through sensors within the computer system; and signals associated with internal performance parameters maintained by software within the computer system.

8. The method of claim 1, wherein detecting an incipient anomaly includes detecting one or more of the following:

an impending failure of the computer system; and a malicious-intrusion event in the computer system.

9. A non-transitory computer-readable storage medium storing instructions that when executed by a computer cause the computer to perform a method for optimizing deployment of sensors in a computer system, the method comprising:

generating a training data set by gathering a set of n signals from n sensors in the computer system during operation of the computer system;

using an inferential model to replace one or more signals in the set of n signals with corresponding virtual signals, wherein the virtual signals are computed based on cross-correlations with unreplaced remaining signals in the set of n signals; and generating a design for an optimized version of the computer system, which includes sensors for the remaining signals, but does not include sensors for the replaced signals;

wherein during operation, the optimized version of the computer system computes the virtual signals from the remaining signals, and uses the virtual signals and the remaining signals while performing prognostic pattern-recognition operations to detect incipient anomalies that arise during execution of the computer system; and wherein using the inferential model to replace the signals in the set of n signals comprises iteratively performing the following operations while ensuring that a pre-specified accuracy criterion is met:

executing a signal-optimization loop to drop a worst signal in a set of remaining signals by:

training and running the inferential model on the set of remaining signals;

using results obtained from running the inferential model to calculate a baseline root-mean-squared error (RMSE) for the set of remaining signals; and         executing an inner loop for each signal in the set of remaining signals, wherein each inner-loop execution excludes a different signal from the set of remaining signals and runs the inferential model on the set of remaining signals without the excluded signal to calculate an RMSE; and     executing an observation-optimization loop one or more times to reduce an observation rate for the set of remaining signals.

10. The non-transitory computer-readable storage medium of claim 9, wherein the method additionally comprises optimizing an observation rate for the set of n signals.

11. The non-transitory computer-readable storage medium of claim 9, wherein executing the signal-optimization loop further comprises:

after the inner loop is executed for each signal in the set of remaining signals:

identifying a worst signal for which the exclusion of the signal yields a lowest RMSE, and dropping the worst signal from the set of remaining signals.

12. The non-transitory computer-readable storage medium of claim 9, wherein executing the observation-optimization loop comprises:

dropping observations from the training data set to reduce an observation rate for the set of remaining signals;

training and running the inferential model on the set of remaining signals with the reduced observation rate;

calculating an RMSE; and if the calculated RMSE exceeds a pre-specified threshold, terminating execution of the observation-optimization loop.

13. The non-transitory computer-readable storage medium of claim 9, wherein the inferential model is trained using a nonlinear, nonparametric (NLNP) regression technique.

14. The non-transitory computer-readable storage medium of claim 13, wherein the NLNP regression technique comprises a Multivariate State Estimation Technique (MSET).

15. The non-transitory computer-readable storage medium of claim 9, wherein the set of n signals can include:

signals associated with physical performance parameters measured through sensors within the computer system; and signals associated with internal performance parameters maintained by software within the computer system.

16. The non-transitory computer-readable storage medium of claim 9, wherein the incipient anomalies include one or more of the following:

an impending failure of the computer system; and a malicious-intrusion event in the computer system.

17. A method for optimizing deployment of sensors and an observation rate in a computer system, comprising:

generating a training data set by gathering a set of n signals from n sensors in the computer system during operation of the computer system;

using an inferential model to replace one or more signals in the set of n signals with corresponding virtual signals computed based on cross-correlations with unreplaced remaining signals in the set of n signals, wherein using the inferential model comprises iteratively performing the following operations while ensuring that a pre-specified accuracy criterion is met:

executing a signal-optimization loop to drop a worst signal in a set of remaining signals by:

training and running the inferential model on the set of remaining signals;

using results obtained from running the inferential model to calculate a baseline root-mean-squared error (RMSE) for the set of remaining signals; and executing an inner loop for each signal in the set of remaining signals, wherein each inner-loop execution excludes a different signal from the set of remaining signals and runs the inferential model on the set of remaining signals without the excluded signal to calculate an RMSE; and executing an observation-optimization loop one or more times to reduce an observation rate for the set of remaining signals to produce a reduced observation rate; and generating a design for an optimized version of the computer system, which includes sensors for the remaining signals, but does not include sensors for the replaced signals;

wherein during operation, the optimized version of the computer system computes the virtual signals from the remaining signals, which are sampled at the reduced observation rate, and uses the virtual signals and the remaining signals while performing prognostic pattern-recognition operations to detect incipient anomalies that arise during execution of the computer system.

18. The method of claim 17, wherein executing the signal-optimization loop further comprises:

after the inner loop is executed for each signal in the set of remaining signals:

identifying a worst signal for which the exclusion of the signal yields a lowest RMSE, and dropping the worst signal from the set of remaining signals.

19. The method of claim 17, wherein executing the observation-optimization loop comprises:

dropping observations from the training data set to reduce an observation rate for the set of remaining signals;

training and running the inferential model on the set of remaining signals with the reduced observation rate;

calculating an RMSE; and if the calculated RMSE exceeds a pre-specified threshold, terminating execution of the observation-optimization loop.

20. The method of claim 17, wherein the incipient anomalies include one or more of the following:

an impending failure of the computer system; and a malicious-intrusion event in the computer system.

\* \* \* \* \*